United States Patent
Korupp et al.

(10) Patent No.: US 9,651,074 B2
(45) Date of Patent: May 16, 2017

(54) CONNECTION SYSTEM

(71) Applicant: Herborner Pumpenfabrik J.H. Hoffmann GmbH & Co. KG, Herborn (DE)

(72) Inventors: Sascha Korupp, Werdorf (DE); Lars Runte, Dillenburg-Frohnhausen (DE); Felix Hees, Giessen (DE)

(73) Assignee: Herborner Pumpenfabrik, Herborn (DE)

( * ) Notice: Subject to any disclaimer, the term of this patent is extended or adjusted under 35 U.S.C. 154(b) by 361 days.

(21) Appl. No.: 14/021,031

(22) Filed: Sep. 9, 2013

(65) Prior Publication Data

US 2014/0072367 A1    Mar. 13, 2014

(30) Foreign Application Priority Data

Sep. 7, 2012  (DE) .................. 10 2012 108 356

(51) Int. Cl.
| | |
|---|---|
| *F16B 17/00* | (2006.01) |
| *F16L 13/10* | (2006.01) |
| *F16L 13/14* | (2006.01) |
| *F16L 41/00* | (2006.01) |
| *F16B 4/00* | (2006.01) |

(52) U.S. Cl.
CPC .............. *F16B 17/00* (2013.01); *F16B 4/004* (2013.01); *F16L 13/103* (2013.01); *F16L 13/14* (2013.01); *F16L 41/008* (2013.01); *Y10T 403/75* (2015.01)

(58) Field of Classification Search
CPC ...... F16B 37/122; F16B 17/00; F16B 17/004; F16B 4/004; F16L 13/14; F16L 13/103; F16L 23/125

USPC ............ 411/180, 181; 403/408.1, 36, 37; 251/145; 285/55, 192, 345, 374, 399
See application file for complete search history.

(56) References Cited

U.S. PATENT DOCUMENTS

| | | | |
|---|---|---|---|
| 3,148,896 A | | 9/1964 | Chu |
| 3,275,030 A | * | 9/1966 | Alvin ............. C02F 1/686 137/565.11 |
| 3,347,568 A | | 10/1967 | Weeden, Jr. et al. |
| 3,424,481 A | * | 1/1969 | Fulghum ............ B65D 39/086 220/304 |
| 3,828,418 A | * | 8/1974 | Laurizio ............ B65D 39/08 29/451 |
| 3,910,550 A | * | 10/1975 | Nelson ............. F01P 11/0276 184/1.5 |

(Continued)

FOREIGN PATENT DOCUMENTS

| | | |
|---|---|---|
| DE | 10 2005 018881 | 10/2006 |
| EP | 0 657 602 | 6/1995 |

(Continued)

*Primary Examiner* — Joshua Kennedy
(74) *Attorney, Agent, or Firm* — Clark & Brody

(57) ABSTRACT

A connection system (1) for detachably connecting a component element to a coated component part (3), includes a coupling element (2) that has a head (6) with a non-round outer cross-section and has a shank (5). The head (6) can be received by a frictional connection in a rotationally fixed manner in a head region (11) of a connection opening (4) of the component part (3). The shank (5) can be received in a friction-locked and/or firmly-bonded manner in a sealing region (12) of the connection opening (4). The head (6) has an internal geometry for connecting the component element.

11 Claims, 1 Drawing Sheet

(56) References Cited

U.S. PATENT DOCUMENTS

| | | | | |
|---|---|---|---|---|
| 4,289,334 | A * | 9/1981 | Riley | F16L 58/188 |
| | | | | 285/141.1 |
| H0155 | H * | 11/1986 | Childress | F16L 41/082 |
| | | | | 285/189 |
| 5,439,257 | A * | 8/1995 | Williamson | F16L 41/084 |
| | | | | 228/132 |
| 5,577,776 | A * | 11/1996 | Welch | F16L 41/06 |
| | | | | 285/197 |
| 6,158,474 | A * | 12/2000 | Ishikawa | F16L 41/12 |
| | | | | 138/109 |
| 6,375,229 | B1 * | 4/2002 | Astor | F16L 41/086 |
| | | | | 285/141.1 |
| 2014/0030014 | A1 * | 1/2014 | Schleeh | F16B 4/004 |
| | | | | 403/333 |

FOREIGN PATENT DOCUMENTS

| | | |
|---|---|---|
| EP | 1 413 768 | 4/2004 |
| EP | 1 510 698 | 3/2005 |
| GB | 619 347 | 3/1949 |
| GB | 2 477 550 | 8/2011 |

\* cited by examiner

CONNECTION SYSTEM

FIELD OF THE INVENTION

The invention relates to a connection system for detachably connecting a component element to a coated component part.

BACKGROUND ART

Connecting component elements to a coated component part is often problematic since through the contact between the component element and the component part, the coating of the component part can get damaged. In many cases, screw connectors are used in which, for example, a drain screw or a vent cock can be screwed in.

Coated threads are principally possible; however, they have the problem that the coating on the thread gets easily damaged by the contact with the mating thread of the component element. Especially when replacing the component element or when repeatedly screwing in and unscrewing, damage to the coating frequently occurs due to the forces prevailing between mating threads. Because of this, the component element can seize up in the component element due to rust which can result in major repair work or even in a complete replacement of the component part.

SUMMARY OF THE INVENTION

It is now an object of the invention to provide a connection system for detachably connecting a component element to a coated component part, which system enables a secure fit of the component element on the component part and avoids the danger of damage to the coating. At the same time, this system shall be cost-effective and implementable with little effort.

Thus, the connection system comprises to coupling element that has a head with a non-round outer cross-section and has a shank, wherein the head can be received by means of a form-locking connection in a rotationally fixed manner in the head region of a connection opening of the component part, and the shank can be received in a friction-locked manner or a firmly bonded manner in the sealing region of the connection opening, and the head has an internal geometry for connecting the component part.

The connection system thus comprises an additional coupling element that can be fixedly connected to the coated component part and that has in its head the connection geometry for connecting the component element. The head, for example, is designed as a polygon, in particular as an octagon or hexagon, and can be received in a form-locking manner in a correspondingly formed head region of the component part. Due to the form-locking arrangement, high torques can also be transmitted from the coupling element to the component part without the risk of damaging the coating. Securing the position of the coupling element in the component part is carried out not only via the form-locking connection of the head, but also by receiving the shank in the sealing region of the connection opening in friction-locked manner or a firmly bonded manner. A friction-locked fit is achieved, for example, through an interference fit, whereas in the case of a firmly-bonded connection, adhesive bonding is carried out, for example. The friction-locked connection can possibly be established with little effort, wherein the firmly-bonded connection has the advantage of a lower load applied to the material at a possibly higher tightness. In any case, the coupling element is secured stationarily in the component part. Due the coupling element, the component element to be connected does not get in direct contact at all with the coated component part, but only with the coupling element so that even in the case of frequently replacing the component elements, there is no concern for damage to the coating of the component part. Also, it is not necessary to provide the component part with a threaded connection, but only with a connection opening with relatively large regions with smooth surfaces. In the sealing region, for example, the connection opening has a round cross-section that can be fabricated extremely accurately with little effort.

Preferably, the internal geometry is designed as an internal thread. Thus, it is relatively simple to screw a component element into the head of the coupling element. The forces acting on the screw connection during higher torques are transmitted through the form-locking connection from the coupling element to the component part. It is possible here without any problems to apply torques of up to 120 Nm since the forces do not act on the coating of the component part so that no stresses are created which could destroy the coating.

Preferably, the coupling element has an axial passage opening. In this manner, various component elements can be connected to the component part via the connection system, for example a screw for draining, a vent cock or a sensor.

Particularly advantageous, the coupling element comprises a corrosion-resistant material, in particular a bronze material. The coupling element is then sufficiently corrosion-resistant, even without additional coating, so that there is no concern for rust-induced seizing up of the component element in the coupling element. The bronze material has a relatively high strength and therefore is well suited for manufacturing a non-rusting metallic thread that is also capable of absorbing high forces. By using a corrosion-resistant material for the coupling element, the connection system can also be used without any problems in fluid-carrying component parts such as, for example, swimming pool pumps and the like.

Preferably, the head has a greater outer diameter than the shank, wherein the head and the shank are in particular formed as one piece. Thus, the head can be provided with sufficiently large, outwardly facing surface areas so that high torques can be transmitted to the component pert. In contrast, the shank has to be held only by means of a frictional connection and, accordingly, can be slimmer and can in particular have a round cross-section. By a step between the shank and the head it is prevented that the coupling element is completely pushed into the coated component part. Thus, operating errors can be ruled out. Also, the internal thread can be axially bounded in a particularly simple manner by a radially inward protruding projection, namely the material of the shank, so that an installation depth is clearly defined.

A particularly simple configuration results from the fact that the shaft has a round cross-section. In this way, establishing a frictional connection between the shank and the sealing region of the connection opening is relatively simple. This leads to a very large contact area and therefore a high tightness between the shank and the component part.

The connection system can also comprise the component part, wherein the coupling element has a greater axial length than the connection opening, wherein the connection opening ends in a flow channel of the component part. Through toe-greater axial length of the coupling element it is possible to compensate tolerances of the wall thickness of the component part, which tolerances occur, for example, during the production of the component part, wherein it is ensured at the same time that the passage opening ends in the component part area that bounds the flow channel so that the entire material of the component part surrounding the connection opening is protected against corrosion by the coupling element. The coupling element can then be approximately flush with the component part area bounding the flow channel, wherein the component part can be, e.g., a pump housing made from, for example, gray iron.

In a preferred configuration, the shank has a greater axial extent than the sealing region. In the axial direction, the coupling element thus is held in the connection opening only in a friction-locked manner or firmly bonded manner and not by a form-locking connection in this manner, a significant tolerance compensation can take place, whereby it is ensured that the connection opening reaches up to a component part area that bounds a flow channel. On an outside, the head of the coupling element can slightly protrude beyond the component part, if necessary. In this manner, applying axial forces for inserting the coupling element is possible without problems and without a tool coming into contact with an optionally coated surface of the component part.

Preferably, the component part comprises a corrosion-resistant coating, wherein the coating extends up to a front side of the shaft, which front side faces away from the head, and in particular up into the passage opening. This can be achieved, for example, in that the coating is applied in the connection opening of the component part only after the insertion of the coupling element. The coating then also covers a transition between the component part and the coupling element, wherein in particular in cases where the coating extends up into the passage opening, a relatively large contact area between the coupling element and the coating is obtained so that a secure bond of the coating takes place. Penetration of corrosive media such as for example, swimming pool water, between the shaft and the sealing region of the component part is then reliably prevented. Thus, the component part is well protected against corrosion.

BRIEF DESCRIPTION OF THE DRAWINGS

Further features, details and advantages of the invention arise from the following description of exemplary embodiments based on the drawings. In the figures.

DETAILED DESCRIPTION OF THE INVENTION

Figure 1:
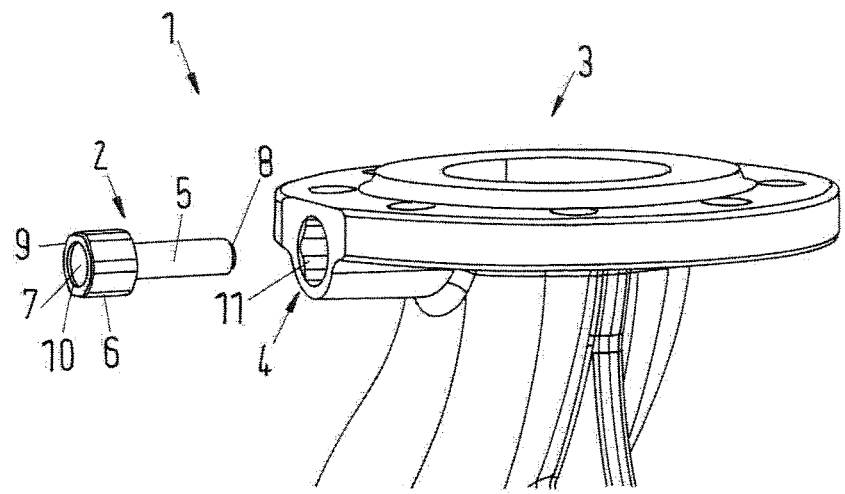
FIG. 1 shows a spatial illustration of a coupling element prior to the insertion into a component part.

FIG. 1 shows a connection system 1 that comprises a coupling element 2 and a coated component part 3 with a connection opening 4 for receiving the coupling element 2. The coupling element 2 has a shank 5 and a head 6, wherein the shank 5 has a round outer cross-section and the head 6 has a polygonal outer cross-section. The coupling element 2 is provided with an axial passage opening 7 that extends axially through the entire coupling element thus from a front side 8 facing away from the head up to a front side 9 arranged on the head 6. Thus, the shank 5 has a quasi-tubular shape. In this exemplary embodiment, the coupling element 2 is made from bronze, thus from a corrosion-resistant material that has sufficient stiffness and strength.

In the head 5 of the coupling element 2 there is an internal thread 10 that serves as internal geometry for connecting a component element. In this exemplary embodiment, the shank 5 is formed with smooth walls on the inside and on the outside.

The connection opening 4 in the component part 3 has a head region 11, the shape of which is adapted to the shape of the head 6 of the coupling element 2. In this exemplary embodiment, the head region 11 is also formed with a hexagonal inner cross-section. In the inserted state of the coupling element 2 in the connection opening 4, flat surfaces of the head 6 then rest against flat surfaces of the head region 11 so that relatively high torques can be transmitted from the coupling element 2 to the component part 3.

Figure 2:
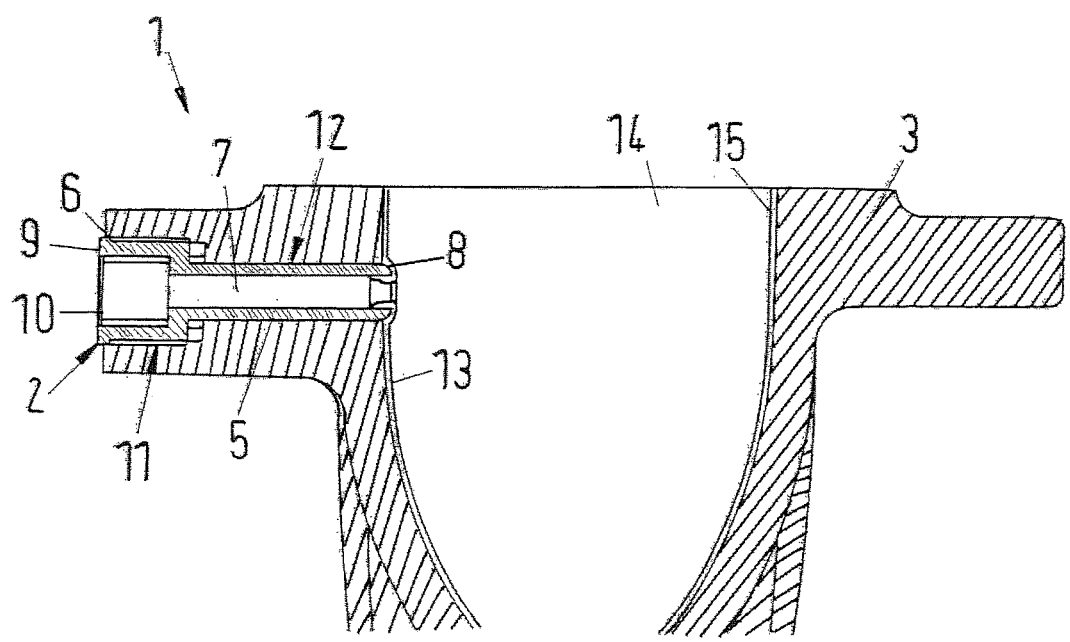
FIG. 2 shows the component part with inserted coupling element in cross-section.

FIG. 2 shows the connection system 1 in the assembled state. The coupling element 2 has been inserted completely into the connect ion opening 4. Here, the shank 5 of the coupling element 2 is held in a friction-locked manner in a sealing region 12 of the connection opening 4 and secures the coupling element 2 with respect to the component part 3 substantially in the axial direction. For this purpose, the shaft 5 can be oversized with respect to the connection opening 4 so that an interference fit is obtained.

The head 6 is received in the head region 11 in a form-locking manner. The sealing region 12 has a lesser axial extent than the shank 5, and the head region 11 has a greater axial extent than the head 6. Thereby, an air gap is created between a step that is formed by the transition from the head region 11 to the sealing region 12, and a step between the shank and the head 6. Thus, there is no form-locking connection in the axial direction so that relatively wide tolerances can be compensated, in particular with regard to the material thickness of the component part 3, which influences the length of the connection opening 4.

The front side 8, in which the passage opening 7 ends, protrudes slightly beyond an inner surface 12 of the component part 3, which inner surface bounds a flow channel 14. Here, flow channel designates generally a chamber that is suitable for receiving a fluid, in particular a liquid.

The inner surface 13 of the component part 3 is provided with a corrosion-resistant coating 15 so that the component part 3, for example, can be made as a gray iron casting and is still sufficiently protected against corrosion. The coating 15 extends also to the front side 8 of the coupling element 2 and can reach up into the passage opening 7. A transition between the coupling element 2 and the component part 3 is therefore covered by the coating and is reliably sealed. In the coupling element 2, no coating is required since the coupling element 2 is made completely from a corrosion-resistant material.

The connection system according to the invention provides a coupling element 2 that is stationarily received in a connection opening 4 of a component part 3, wherein, the coupling element 2 consists of a corrosion-resistant material, and the component part 3 is provided with a corrosion-resistant coating that also extends over a transition between the coupling element 2 and the component part 3. The coupling element 2 is received with its relatively slim shank 5 in a friction-locked manner and/or firmly bonded manner in the sealing region 12 of the connection opening 4 so that a medium from the flow channel through the passage opening 7 and cannot penetrate between the component part 3 and the coupling element 2. Thus, the coupling element 2 protects the component part 3 against corrosion. Thus, the invention is particularly advantageously suitable for use with pumps or pump housings, which form the component part 3.

Component elements, such as, for example, a drain cock or a bleed screw, are connected to the head 6 of the coupling element 2, for example, are screwed into the head 6. The occurring torques are transmitted to the component part 3 through the form-locking connection between the head 6 and the head region 11 of the connection opening 4, wherein no inadmissibly high stresses are introduced into the coating 15. Damage to a surface of the coupling element 2 in the region of the internal geometry does not result in the occurrence of rusty spots since the coupling element 2 is made from a corrosion-resistant material. Rather, slight damage to the surface has no consequences. Detaching the component element is therefore possible without any problems even after a long period of time, and there is no concern for rust-induced seizing up.

Apart from the component part, the component elements can, of course, also comprise a coating.

The connection system according to the invention provides a secure solution for establishing a detachable connection of a component element with a coated component part, wherein in particular a screw connection is also possible with higher torques and without damaging a coating. For this purpose, a coupling element is stationarily received and held in a connection opening of the component part by means of a combination of frictional and form-locking connections and a firmly-bonded connection. The shank of the coupling element provides here for securing the axial position by means of a frictional connection or a firmly-bonded connection and assumes the task of sealing, while transmitting torques takes place through the form-locking connection between the head and the head region.

A polygonal geometry on the head prevents the head from rotating even in the case of high torques wherein, at the same time, screwing into a stable non-rusting metallic thread in the head of the coupling element is possible. Thus, screw connections on coated component parts such as, for example, pump housings can be reliably implemented, wherein torques no to a maximum of 120 Nm can also be introduced without any risk. There is no concern for a malfunction of the coating caused by an excessively high.

Since the coupling element is made from a rustproof material, there is no concern for rusting, not even over a period of several years.

The invention is not limited to any one of the above-described embodiments, but can be modified in many different ways.

All features and advantages, including constructional details, spatial arrangements and method steps, arising from the description, in themselves and also in many different combinations, can be essential for the invention.

REFERENCE LIST

1 Connection system
2 Coupling element
3 Component part
4 Connection opening
5 Shank
6 Head
7 Passage opening
8 Front side
9 Front side
10 Internal thread
11 Head region
12 Sealing region
13 inner surface
14 Flow channel
15 Coating

The invention claimed is:

1. A connection system (1) for detachably connecting a component element to a coated component part (3), comprising a coupling element (2) that has a head (6) with a non-round outer cross-section and has a shank (5), wherein the head (6) is received by means of an interlock in rotationally fixed manner in a head region (11) of a connection opening (4) of the component part (3), and the shank (5) is secured stationarily in a frictionally held manner or firmly bonded manner in a sealing region (12) of the connection opening (4), and the head (6) has an internal geometry for connecting the component element, wherein the coupling element has an axial passage opening, inside walls of the shank (5) that receive a component element and that extend along a longitudinal axis of the shank are smooth, and the coupling element comprises a corrosion-resistant material, wherein the connection system (1) further comprises the component part (3), wherein the component part (3) has a coating (15) which extends over an interface between the coupling element (2) and the component part (3), the coating (15) reliably preventing corrosive media to flow the between the shank and sealing region of the component part (3).

2. The connection system according to claim 1, characterized in that the internal geometry is formed as an internal thread (10).

3. The connection system according to claim 1, characterized in that the head (6) has a greater outer diameter than the shank (5), wherein the head (6) and the shank (5) are in particular designed as one piece.

4. The connection system according to claim 1, characterized in that the shank (5) has a round cross-section.

5. The connection system according to claim 1, wherein the coupling element (2) has a greater axial length than the connection opening (4), wherein the connection opening (4) ends in a flow channel (14) of the component part.

6. The connection system according to claim 5, characterized in that the shank (5) has a greater axial extent than the sealing region (12).

7. The connection system according to claim 1, wherein the coating (15) extends up to a front side of the shank (5), which front side faces away from the head (6), and extends in particular up into the passage opening (7).

8. The connection system of claim 1, wherein the coating is applied after insertion of the coupling element into the connection opening.

9. The connection system of claim 1, wherein the component part c is a pump housing.

10. The connection system of claim 9, wherein the pump housing is made from gray iron.

11. The connection system of claim 1, wherein the corrosion-resistant material comprises a bronze material.

* * * * *